US012598387B2

(12) United States Patent
Nakayama

(10) Patent No.: US 12,598,387 B2
(45) Date of Patent: Apr. 7, 2026

(54) OPTICAL IMAGE STABILIZATION APPARATUS THAT PROVIDES IMAGE STABILIZATION BY USING MOVABLE MEMBER AND OPTICAL APPARATUS

(71) Applicant: CANON KABUSHIKI KAISHA, Tokyo (JP)

(72) Inventor: Wataru Nakayama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 195 days.

(21) Appl. No.: 18/536,614

(22) Filed: Dec. 12, 2023

(65) Prior Publication Data

US 2024/0205548 A1    Jun. 20, 2024

(30) Foreign Application Priority Data

Dec. 15, 2022    (JP) ................................. 2022-199973

(51) Int. Cl.
| | |
|---|---|
| *H04N 23/68* | (2023.01) |
| *G02B 7/02* | (2021.01) |
| *G02B 27/64* | (2006.01) |

(52) U.S. Cl.
CPC ............. *H04N 23/687* (2023.01); *G02B 7/02* (2013.01); *G02B 27/646* (2013.01)

(58) Field of Classification Search
CPC ...... H04N 23/687; H04N 23/50; H04N 23/68; H04N 23/682; G02B 7/02; G02B 27/646;
G02B 15/14; G02B 27/64; G03B 5/00; G03B 13/32; G03B 2205/0007; G03B 2205/0069; G03B 2217/005
See application file for complete search history.

(56) References Cited

U.S. PATENT DOCUMENTS

| | | | |
|---|---|---|---|
| 6,631,042 B2 | 10/2003 | Noguchi | |
| 9,529,209 B2 | 12/2016 | Nakamura et al. | |
| 2007/0212046 A1* | 9/2007 | Sogoh | .................... H04N 23/68 |
| | | | 348/208.7 |
| 2010/0166401 A1* | 7/2010 | Akutsu | .................... G03B 5/00 |
| | | | 359/557 |

(Continued)

FOREIGN PATENT DOCUMENTS

| | | |
|---|---|---|
| JP | 2001290184 A | 10/2001 |
| JP | 2008209435 A | 9/2008 |

(Continued)

*Primary Examiner* — Gevell V Selby
(74) *Attorney, Agent, or Firm* — ROSSI, KIMMS & McDOWELL LLP

(57) ABSTRACT

An optical image stabilization apparatus includes a first position detector and a second position detector configured to detect a position of a movable member relative to a base member in directions of first and second detection axes that are not orthogonal, a first driving unit and a second driving unit configured to drive the movable member relative to the base member in directions of first and second drive axes. The first or second detection axis is different from the first and second drive axes. An intersection of the first and second drive axes is closer to a center of gravity of a movable unit including an element fixed to the movable member among an optical element, the movable member, and the first and second driving units, than an intersection of the first and second detection axes.

10 Claims, 7 Drawing Sheets

(56) References Cited

U.S. PATENT DOCUMENTS

2014/0338175 A1 * 11/2014 Tanaka ............... H04N 23/6812
                                                    29/428
2021/0333567 A1 * 10/2021 Jeong .................... H04N 23/68

FOREIGN PATENT DOCUMENTS

| JP | 2011180519 | A | 9/2011 |
| JP | 2013140252 | A | 7/2013 |
| JP | 2014228624 | A | 12/2014 |

* cited by examiner

THIS EXAMPLE

COMPARATIVE EXAMPLE

OPTICAL IMAGE STABILIZATION APPARATUS THAT PROVIDES IMAGE STABILIZATION BY USING MOVABLE MEMBER AND OPTICAL APPARATUS

BACKGROUND

Technical Field

One of the aspects of the embodiments relates to an optical image stabilization apparatus configured to provide image stabilization.

Description of Related Art

Japanese Patent Application Publication No. 2001-290184 discloses, as an optical image stabilization apparatus configured to provide image stabilization by driving an image stabilizing element such as a lens in a direction orthogonal to an optical axis according to the shake of the optical apparatus, an optical image stabilization apparatus that drives a movable member using two actuators and detects the position of the movable member using two position sensors. This optical image stabilization apparatus suppresses a position detection error when the movable member rotates around the optical axis, by the detection center axes of the two position sensors orthogonal to each other at the optical axis position of the lens.

Japanese Patent Application Publication No. 2011-180519 discloses an optical image stabilization apparatus that drives a movable member using three actuators and detects the position of the movable member using three position sensors. In this optical image stabilization apparatus, the driving directions of the three actuators and the detection directions of the three position sensors coincide with each other. Japanese Patent Application Publication No. 2008-209435 discloses an optical image stabilization apparatus that detects the position of a movable member using two position sensors in which an intersection (point) of their detection center axes coincides with the center of gravity of the movable member, and drives the movable member using two actuators in which their driving center axes intersect at a position farther from the center of gravity than the intersection of the detection center axes.

These optical image stabilization apparatuses are demanded to be smaller while the position detection error of the movable member is suppressed.

SUMMARY

An optical image stabilization apparatus according to one aspect of the embodiment includes a movable member configured to hold an optical element, a base member configured to hold the movable member movably within a movement surface that intersects an optical axis of the optical element, a first position detector and a second position detector configured to detect a position of the movable member relative to the base member in a direction of a first detection axis and a direction of a second detection axis that are different from each other and parallel to the movement surface, respectively, first driving unit and a second driving unit configured to drive the movable member relative to the base member in a direction of a first drive axis and a direction of a second drive axis that are different from each other and parallel to the movement surface, respectively. An angle formed by the first detection center axis and the second detection center axis is not a right angle. At least one of the direction of the first detection axis and the direction of the second detection axis is different from each of the direction of the first drive axis and the direction of the second drive axis. An intersection of the first drive center axis and the second drive center axis is closer to a center of gravity of a movable unit including an element fixed to the movable member among the optical element, the movable member, the first driving unit, and the second driving unit, than an intersection of the first detection center axis and the second detection center axis. An optical apparatus having the above optical image stabilization apparatus also constitutes another aspect of the embodiment.

Further features of the disclosure will become apparent from the following description of embodiments with reference to the attached drawings.

DESCRIPTION OF THE EMBODIMENTS

Referring now to the accompanying drawings, a detailed description will be given of embodiments according to the disclosure.

Example 1

Figure 1:
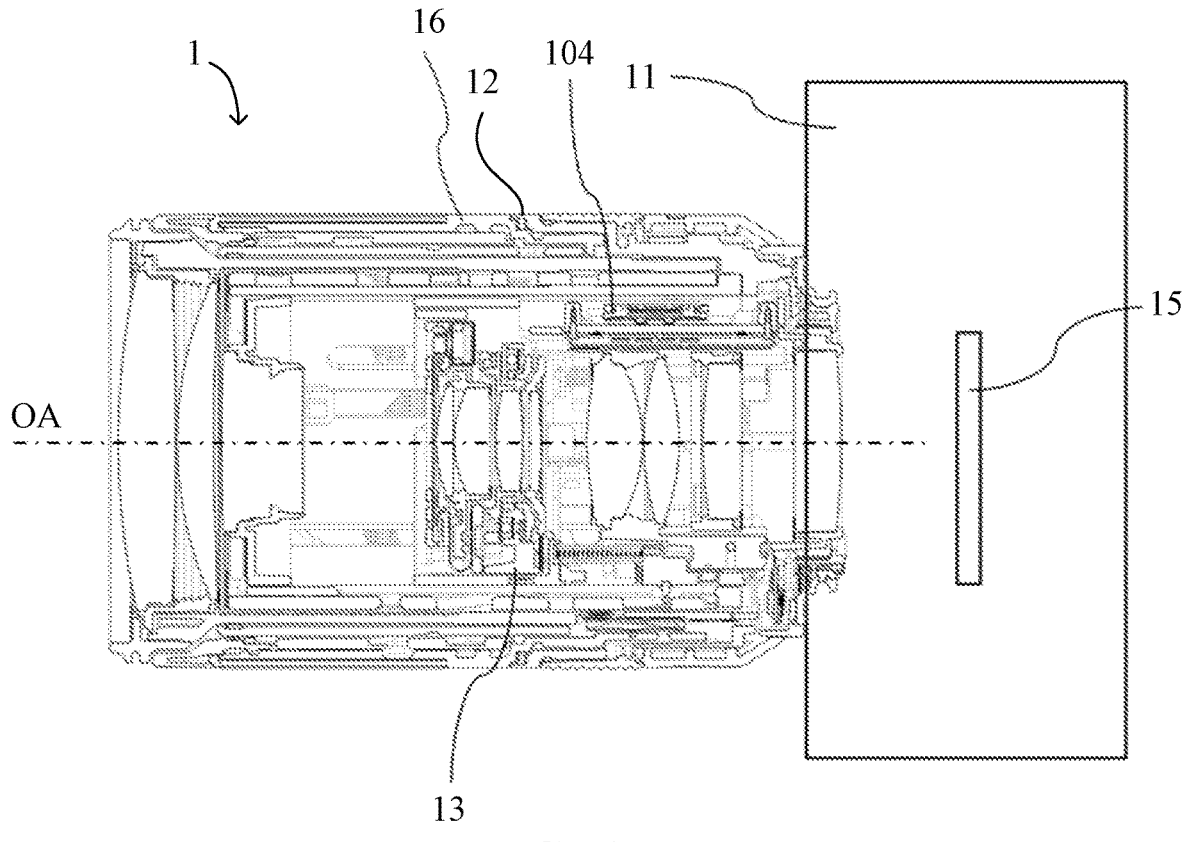
FIG. 1 is a side sectional view illustrating the configuration of a camera system according to Example 1.

FIG. 1 illustrates the configuration of a camera system 1 according to Example 1. The camera system 1 includes an image pickup apparatus 11 and a lens apparatus (optical apparatus) 12 attachable to and detachable from the image pickup apparatus 11. The image pickup apparatus as the optical apparatus may be of a lens-integrated type.

The image pickup apparatus 11 generates an image signal by photoelectrically converting (imaging) an object image formed by an imaging optical system housed in a barrel 16 of the lens apparatus 12 using an image sensor 15, such as a CCD sensor and a CMOS sensor. The lens apparatus 12 includes an image stabilizing unit 13 as an optical image stabilization apparatus (described below) housed in the barrel 16, and a focus actuator 104 configured to drive a focus lens. The imaging optical system has an optical axis OA extending toward the object side and the image side. The following description will refer to a direction in which the optical axis OA extends as an optical axis direction.

Figure 2:
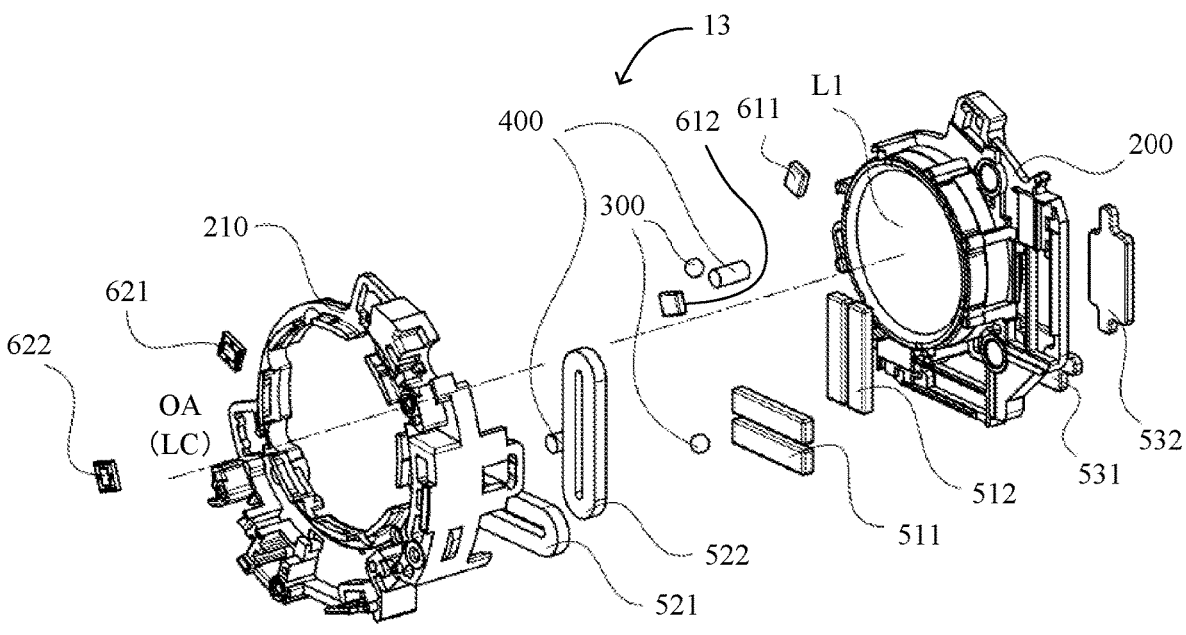
FIG. 2 is an exploded perspective view of an image stabilizing unit according to Example 1.
Figure 3:
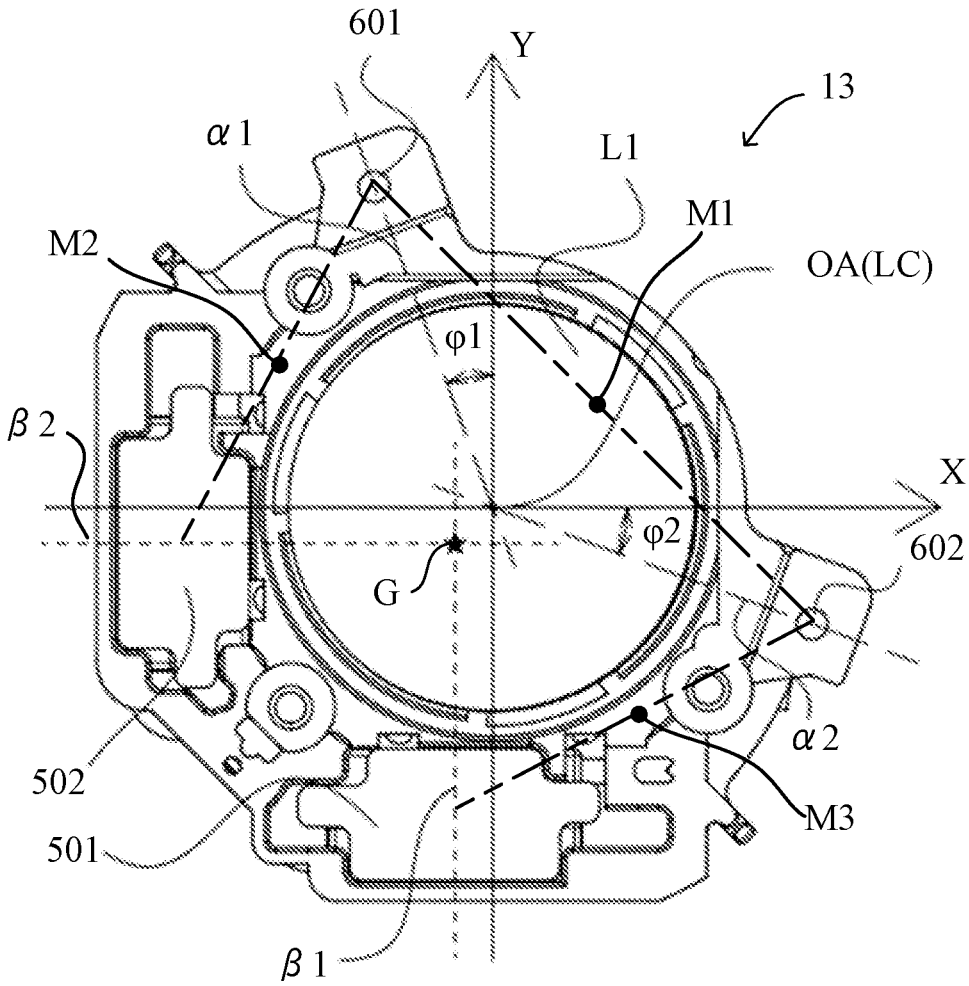
FIG. 3 is a rear view of the image stabilizing unit according to Example 1.

FIG. 2 illustrates an exploded view of the image stabilizing unit 13 viewed obliquely from the object side. FIG. 3 illustrates the image stabilizing unit 13 viewed from the image side (rear side).

The image stabilizing unit 13 corrects image blurs caused by camera shake such as manual shake detected by a shake sensor (not illustrated) such as an angular velocity sensor, by moving a correction lens L1 as an image stabilizing element (an optical element) within a movement surface that intersects (or is orthogonal to) the optical axis OA. The movement surface may be a plane orthogonal to the optical axis OA, or may be a curved surface having a directional component orthogonal to the optical axis OA.

The correction lens L1 is held by a movable member 200 and has a lens center axis (optical axis) LC. The movable member 200 is held movably within the movement surface by a base member 210 via three rolling balls (only two are illustrated in FIG. 2) 300 arranged at three locations in the circumferential direction around the lens center axis LC. The movable member 200 is biased in the optical axis direction relative to the base member 210 by three tension springs (only two are illustrated in FIG. 2) 400 arranged at three locations in the circumferential direction. Thereby, the movable member 200 is pressed against the base member 210 via the rolling balls 300, positioned in the optical axis direction, and held movably within the movement surface. The number of rolling balls 300 and tension springs 400 is not limited to three, respectively, as long as the movable member 200 can be held movably within the movement surface.

Hereinafter, among the components of the movable member 200, the correction lens L1, and the actuators 501 and 502 described below, the drive magnet 511 and the yoke 531 will be collectively referred to as a movable unit.

The image stabilizing unit 13 includes two actuators 501 and 502 as voice coil motors (VCM) that drive the movable unit. The actuator 501 as a first driving unit includes a drive magnet 511, a coil 521, and a yoke 531. The drive magnet 511 is fixed to a lower part of the movable member 200. The coil 521 is fixed to a lower part of the base member 210 so as to face the drive magnet 511 in the optical axis direction. The yoke 531 is formed into a plate shape from a ferromagnetic material such as a ferrous metal, disposed on the opposite side of the coil 521 with respect to the drive magnet 511 in the optical axis direction, and is fixed to the movable member 200.

The actuator 502 as a second driving unit includes a drive magnet 512, a coil 522, and a yoke 532. The drive magnet 512 is fixed to the left side portion of the movable member 200. The coil 522 is fixed to the left side portion of the base member 210 so as to face the drive magnet 512 in the optical axis direction. The yoke 532 is formed into a plate shape from the above ferromagnetic material, disposed on the opposite side of the coil 522 with respect to the drive magnet 512, and fixed to the movable member 200 in the optical axis direction. In each actuator, the drive magnet and yoke may be fixed onto the base member, and the coil may be fixed onto the movable member.

The actuator 501 generates a driving force that drives the movable unit in the Y-axis direction in FIG. 3 by energizing the coil 521. The actuator 502 generates a driving force that drives the movable unit in the X-axis direction in FIG. 3 when the coil 522 is energized. Controlling the current values of the driving forces generated by these actuators 501 and 502 to be applied to the coils 521 and 522 can drive the movable unit in an arbitrary direction and position within the movement surface.

As illustrated in FIG. 3, the actuator 501 has a first drive center axis $\beta 1$ that passes through the driving force generating center and extends in a driving force generating direction (Y-axis direction: first drive direction) parallel to the movement surface. The actuator 502 has a second drive center axis $\beta 2$ that passes through the driving force generating center and extends in a driving force generating direction (X-axis direction: second drive direction) parallel to the movement surface. The driving force generating center referred to here is, for example, the center of the coil facing surface of each drive magnet fixed to the movable member 200 in a plane orthogonal to the optical axis.

The first drive center axis $\beta 1$ and the second drive center axis $\beta 2$ do not need to be parallel to the X-axis and the Y-axis.

The position sensor 601 as a first position detector includes a magnetic sensor 621 such as a Hall element fixed to the base member 210 and a sensor magnet 611 fixed to a portion of the movable member 200 facing the magnetic sensor 621. The position sensor 602 as a second position detector includes a magnetic sensor 622 fixed to the base member 210 and a sensor magnet 612 fixed to a portion of the movable member 200 facing the magnetic sensor 622.

As illustrated in FIG. 3, the position sensor 601 has a first detection center axis $\alpha 1$ that passes through its detection center and extends in a position detection direction (referred to as a first detection direction hereinafter) parallel to the movement surface. The position sensor 602 has a second detection center axis $\alpha 2$ that passes through its detection center and extends in a position detection direction (referred to as a second detection direction hereinafter) parallel to the movement surface. The detection center here is, for example, the center of the magnetic sensor facing surface of the sensor magnet fixed to the movable member 200 in a plane orthogonal to the optical axis.

In the position sensor 601, the sensor magnet 611 moves in the first detection direction together with the movable unit relative to the magnetic sensor 621, the magnetic field relative to the magnetic sensor 621 changes, and the output signal from the magnetic sensor 621 changes. Therefore, the position of the movable unit in the first detection direction can be detected using the output signal from the magnetic sensor 621. In the position sensor 602, the sensor magnet 612 moves in the second detection direction together with the movable unit relative to the magnetic sensor 622, the magnetic field relative to the magnetic sensor 622 changes, and the output signal from the magnetic sensor 622. Therefore, the position of the movable unit in the second detection direction can be detected using the output signal from the magnetic sensor 622.

In each position sensor, the sensor magnet may be fixed to the base member, and the magnetic sensor may be fixed to the movable member.

A description will now be given of the arrangement of the actuators 501 and 502 and the position sensors 601 and 602 in the XY plane illustrated in FIG. 3. Here, as illustrated in FIG. 3, the movable unit is located at a neutral position relative to the base member 210, in which the center axis LC (the optical axis) corresponding to the optical axis of the correction lens L1 (hereinafter referred to as the lens center axis) LC coincides with the optical axis OA of the imaging optical system.

The X-axis and Y-axis are orthogonal to each other at the lens center axis LC (optical axis OA) as an origin. As described above, the first central drive axis $\beta 1$ of the actuator 501 is parallel to the Y-axis, and the second central drive axis $\beta 2$ of the actuator 502 is parallel to the X-axis. The first drive center axis β1 and the second drive center axis β2 intersect at a position marked with an asterisk and shifted toward the actuator side (lower left side in FIG. 3) than the lens center axis LC. In this example, the intersection of the first drive center axis β1 and the second drive center axis β2 coincides with (overlaps) the center of gravity G of the movable unit. The term "coincidence" here allows a shift within a manufacturing error range. However, even if the intersection is significantly shifted from the center of gravity, it may be located near the center of gravity.

On the other hand, the first detection center axis α1 of the position sensor 601 and the second detection center axis α2 of the position sensor 602 intersect at the lens center axis LC. That is, the first detection center axis α1 and the second detection center axis α2 each pass through the lens center axis LC.

The intersection of the first drive center axis β1 and the second drive center axis β2 described above is closer to the center of gravity G of the movable unit than the intersection (lens center axis LC) of the first detection center axis α1 and second detection center axis α2. This relationship does not change even in a case where the movable unit is moved from the neutral position relative to the base member 210.

The first detection center axis α1 of the position sensor 601 is tilted by an angle φ1 from the Y-axis in the counterclockwise direction (toward the actuator 502 side) around the lens center axis LC. The second detection center axis α2 of the position sensor 602 is tilted by an angle φ2 from the X-axis in the clockwise direction around the lens center axis LC (toward the actuator 501 side). That is, an angle that is formed by the first and second detection center axes α1 and α2 and located in an area that includes a midpoint M1 between the detection centers of the position sensors 601 and 602 is not a right angle, but an obtuse angle (an angle larger than 90°). An angle that is formed by the first detection center axis α1 and the second drive center axis β2 and located in an area that includes a midpoint M2 between the detection center of the position sensor 601 and the driving force generating center of the actuator 502 is smaller than 90°. An angle that is formed by the second detection center axis α2 and the first drive center axis β1 and located in an area that includes a midpoint M3 between the detection center of the position sensor 602 and the driving force generating center of the actuator 501 is smaller than 90°.

The first detection direction of the position sensor 601 does not coincide with the first drive center axis β1 of the actuator 501, and the second detection direction of the position sensor 602 does not coincide with the second drive center axis β2 of the actuator 502. A method of calculating the position of the movable unit in the X and Y axis directions from the outputs of the position sensors 601 and 602 at this time will be described below.

Both the first and second detection directions do not necessarily have to coincide with the first and second drive center axes β1 and β2, respectively, and the first detection direction does not necessarily have to coincide with the first drive center axis β1. The second detection direction may not coincide with the second drive center axis β2.

Figure 4:
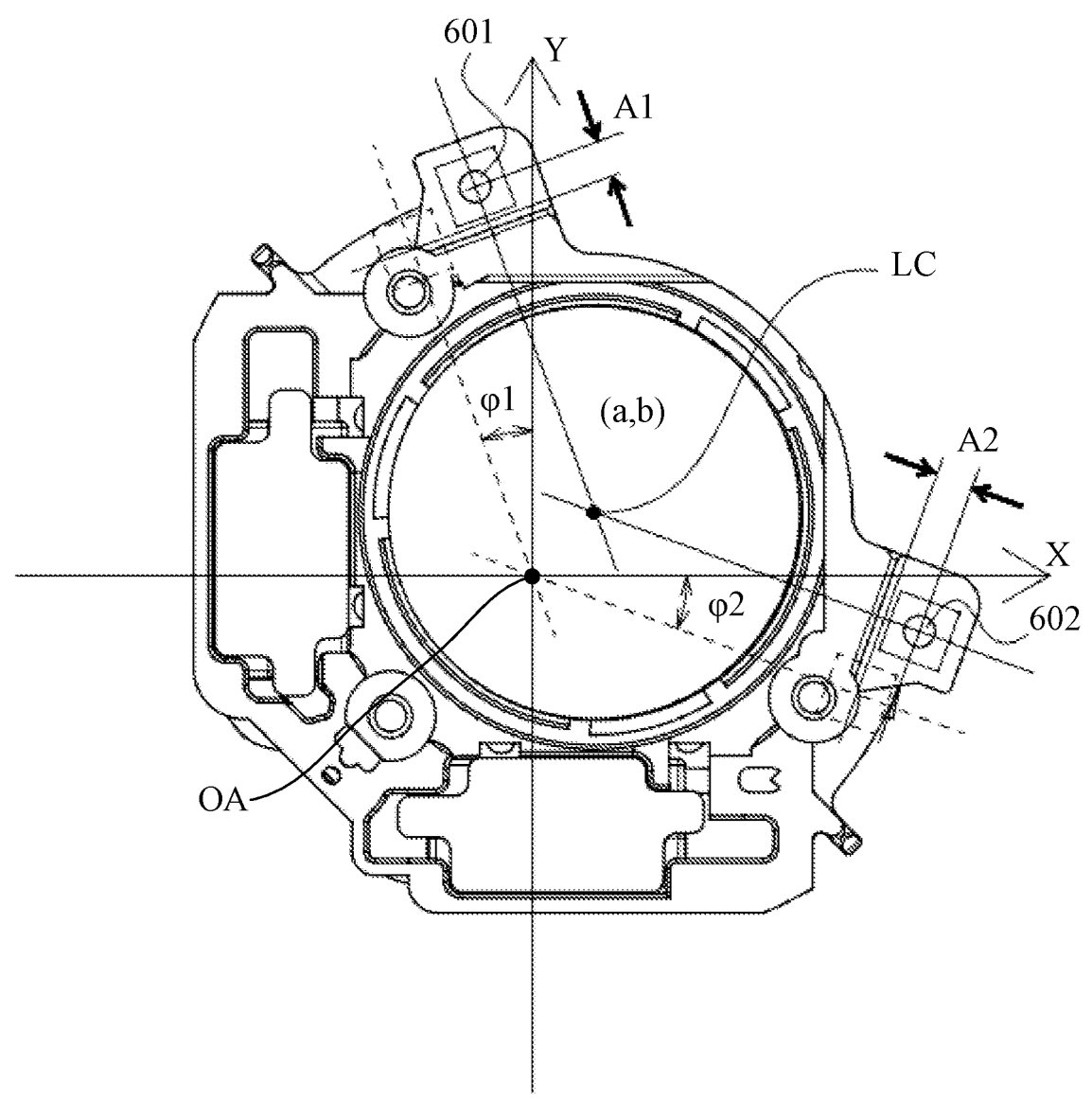
FIG. 4 is another rear view of the image stabilizing unit according to Example 1.

Referring now to FIG. 4, a description will be given of the method of calculating the position of the movable unit. FIG. 4 illustrates the image stabilizing unit 13 viewed from the image side, in which the movable unit moved from the neutral position relative to the base member 210.

A position (a, b) of the center of the correction lens L1 from the neutral position can be expressed by the following equations (1) and (2):

$$a = (-A1 \times \sin\varphi2 - A2 \times \cos\varphi1)/(\sin\varphi1 \times \sin\varphi2 - \cos\varphi1 \times \cos\varphi2) \quad (1)$$

$$b = (-A1 \times \cos\varphi2 - A2 \times \sin\varphi1)/(\sin\varphi1 \times \sin\varphi2 - \cos\varphi1 \times \cos\varphi2) \quad (2)$$

where A1 is an output of the position sensor 601 (a moving amount of the movable unit in the first detection direction in the position sensor 601), and A2 is an output of the position sensor 602 (a moving amount of the movable unit in the second detection direction in the position sensor 602).

Thus, even if the angle formed by the first and second detection center axes α1 and α2 is not a right angle, calculating the equations (1) and (2) can calculate the position (moving amount) of the correction lens L1.

If the intersection angle of the detection center axes of the two position sensors is a right angle, the position detection error may increase in a case where the movable unit rotates (rolls) around the lens center axis LC relative to the base member. Setting the intersecting angle between the detection center axes of the two position sensors to an angle other than a right angle as in this example can reduce the position detection error when the movable unit rotates. This will be described in detail below.

In a case where the first and second detection directions of the two position sensors coincide with the first and second drive directions of the two actuators, the output of each position sensor can be directly used to control the actuators but the arrangement freedom degree of the two position sensors is limited. On the other hand, this example uses the moving amount (position) of the movable unit calculated from the outputs of the two position sensors 601 and 602 to control the actuators 501 and 502. Thereby, it becomes unnecessary to coincide the first and second detection directions of the position sensors 601 and 602 with the first and second drive directions of the actuators 501 and 502, respectively, and the arrangement freedom degree of the position sensors 601 and 602 can be improved.

Figures 5A, 5B:
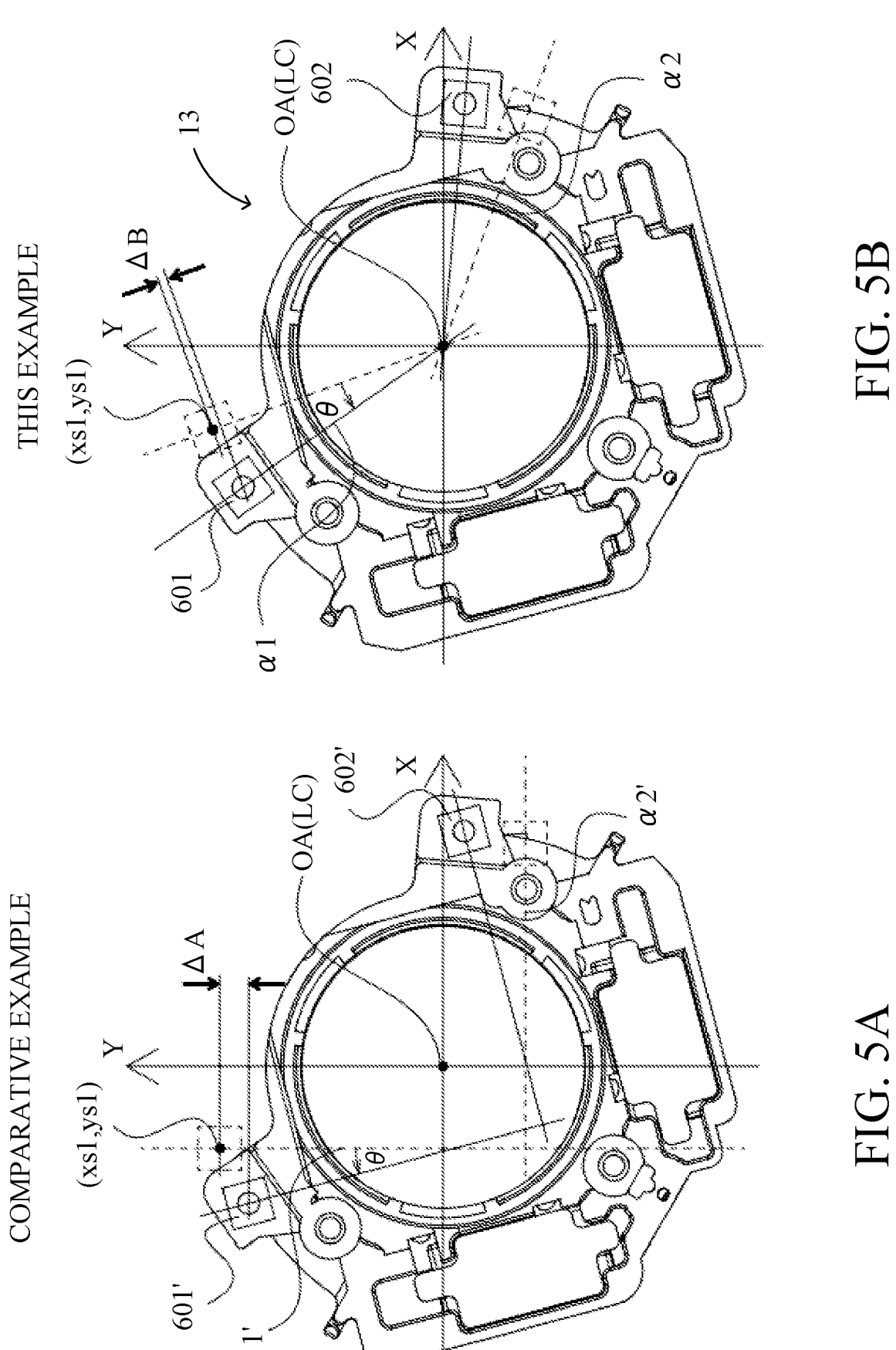
FIGS. 5A and 5B are other rear views of the image stabilizing unit according to a comparative example and Example 1.

Referring now to FIGS. 5A and 5B, a description will be given of the position detection error in a case where the movable unit rotates around the lens center axis LC. FIG. 5A illustrates an image stabilizing unit according to a comparative example viewed from the image side, in which the angle formed by the first detection center axis α1' and the second detection center axis α2' is a right angle and the first and second detection center axes α1' and α2' does not intersect the lens center axis LC. FIG. 5B illustrates the image stabilizing unit 13 according to this example viewed from the image side, in which the angle formed by the first detection center axis α1 and the second detection center axis α2 is not a right angle and the first and second detection center axes α1' and α2' intersect the lens center axis LC. In FIGS. 5A and 5B, the movable unit rotates by an angle θ around the lens center axis LC relative to the base member, and the position sensors 601' and 601 move to positions rotated by an angle θ from the position (xs1, ys1) where the movable unit does not rotate.

In FIG. 5A, the position sensor 601' is moved by AA defined by the following equation due to the angle θ of the movable unit in the first detection direction (the Y-axis direction in which the first detection center axis α1' extends) before rotation:

$$\Delta A = -xs1 \times \sin\theta + ys1 \times (1 - \cos\theta) \quad (3)$$

Since the lens center axis LC as the center of rotation does not move, AA becomes the position detection error. From equation (3), it is understood that the position detection error increases as the distance in the X direction between the first detection center axis α1' and the lens center axis LC increases.

On the other hand, in FIG. 5B, the position sensor 601 is moved by ΔB defined by the following equation due to the rotation of the movable unit by the angle θ in the first detection direction (the direction in which the first detection center axis α1 extends) before rotation:

$$\Delta B = \left(xs1^2 + ys1^2\right)^{0.5} \times (1 - \cos\theta) \qquad (4)$$

ΔB becomes the position detection error, but in a range where the angle θ is small, (1−cos θ) can be considered to be minute. This similarly applies to the position sensor 602.

Therefore, this example arranges the position sensors 601 and 602 such that the intersection of the first and second detection center axes α1 and α2 is located on the lens center axis LC, and an angle between the first and second detection center axes α1 and α2 is not a right angle. Thereby, the position detection error can be suppressed when the movable unit rotates around the lens center axis LC.

The intersection of the first and second detection center axes α1 and α2 does not necessarily have to be set on the lens center axis LC. However, as described with reference to FIG. 5A, the position detection error increases as the distance between each detection center axis and the lens center axis LC increases, so the position sensors 601 and 602 may be arranged so that the distance becomes short.

As the movable unit rotates around the lens center axis LC, the position sensor 601 may erroneously detect the position of the correction lens L1. At this time, the movement of the movable unit is controlled using a position shifted by the detection error from the current position of the correction lens L1 as the target position, and the moving amount of the correction lens L1 becomes larger or smaller than the actual required moving amount. An error relative to the target position causes residual image blur, and suppressing the position detection error leads to a reduction in residual image blur.

The position detection error in the position sensor 601 increases in proportion to the distance ΔS between the first detection center axis α1 and the lens center axis LC. Similarly, the position detection error increases in proportion to the rotation angle θ of the movable unit around the lens center axis LC. At this time, the rotation around the lens center axis LC is caused by a moment caused by the driving force generated by the actuator 501, and is approximately proportional to a distance ΔG between the center of gravity G of the movable unit and the first drive center axis β1. Therefore, the position detection error is proportional to the product of the distance ΔS and the distance ΔG, and reducing this product can reduce the position detection error.

Figure 6:
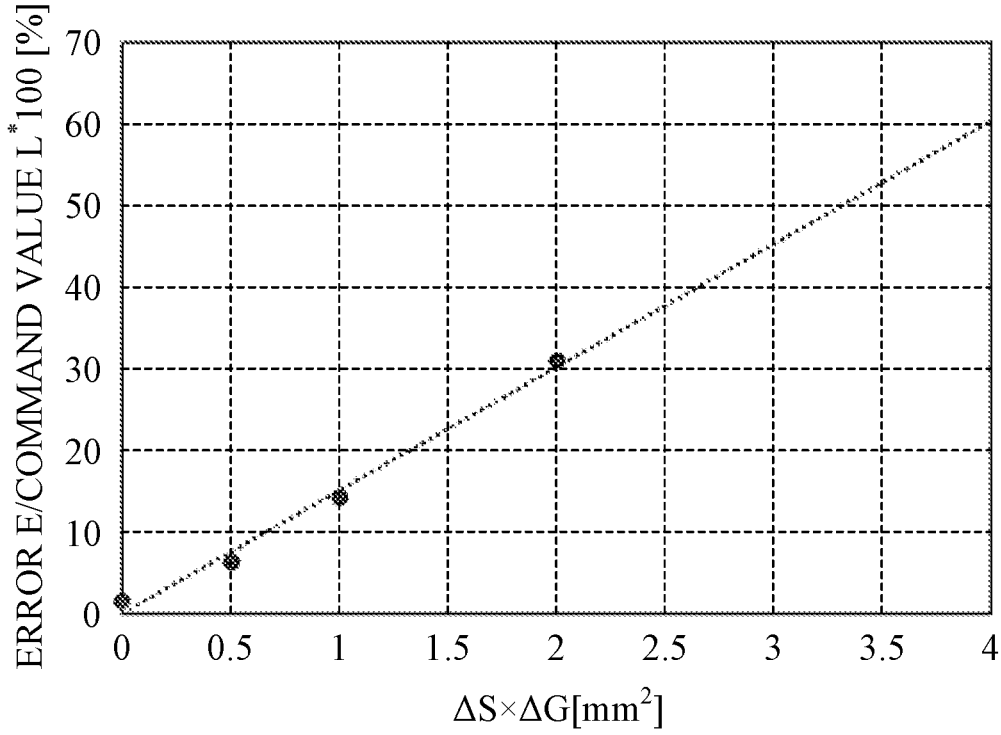
FIG. 6 illustrates a position error rate of the movable member relative to a product of a distance between an intersection of detection center axes and the optical axis and a distance between an intersection of drive center axes and the optical axis in Example 1.

FIG. 6 illustrates the simulation result of the position detection error of the position sensor 601 under the condition where the frequency of manual shake is 1 Hz and the amplitude is 0.06° in this example. The horizontal axis illustrates the product of ΔS and ΔG, and the vertical axis illustrates the ratio (%) of an error E to a drive command value L corresponding to the target position.

In order to reduce an image blur amount to 50% or less compared to the case where image blur is not corrected, a ratio of E to L is to be 50% or less. As understood from FIG.

6, in order to satisfy this condition, the position sensor 601 may be disposed so that the product of ΔS and ΔG is 3.3 mm² or less.

In general, image stabilization (image blur correction) performance is expressed by the number of correction steps. For example, in a case where the number of correction steps is one, a shake amount can be suppressed to that equivalent in a case of no image blur correction even if the exposure time is twice as long. For this purpose, it is necessary to suppress the error per unit time between the position of the correction lens L1 and the drive command value to ½ of that in the case of no image blur correction. Similarly, in a case where the number of correction steps is n, the reference exposure time becomes 2" times, and it is necessary to suppress the error per unit time to ½" times as much as the error per unit time in the case of no image blur correction. Considering the above, ΔS×ΔG may be suppressed to 1.7 mm² or less from FIG. 6, for example, in a case where the number of correction steps is two. In a case where the number of correction steps is three, ΔS×ΔG may be suppressed to 0.8 mm² or less, and in a case where the number of correction steps is four, ΔS×ΔG may be suppressed to 0.4 mm² or less.

Although the camera shake has a frequency of 1 Hz and an amplitude of 0.06° in this example, actual camera shake has various frequencies and amplitudes, including higher frequencies or larger amplitudes. Actual image stabilization may require a larger driving force, and along with this, a rotation amount of the movable unit around the lens center axis LC and the position detection error may also increase. Therefore, in order to suppress the position detection error, at least the condition illustrated in this example may be satisfied.

The simulation illustrated in FIG. 6 sets the mass of the movable unit to approximately 10 g. As described above, the moment caused by the driving force generated by the actuator affects the rotation of the movable unit around the lens center axis LC and the associated position detection error. At this time, an increase in the mass of the movable unit increases the driving force for driving the movable unit, and accordingly, the moment for rotating the movable unit around the lens center axis LC increases. Hence, an increase in the mass of the movable unit may increase the position detection error, and therefore the product of ΔS and ΔG may be smaller.

On the other hand, if the mass of the movable unit is small, the position detection error may be able to be suppressed even if the product of ΔS and ΔG is large. For example, in a case where only changes in the mass of the movable unit are considered, if the mass is twice as large, the position error relative to the drive command value becomes approximately twice that, and if the mass is ½, the error will be approximately ½ times as much. In this case, in order to set the number of correction steps to one, ΔS×ΔG may be 1.7 mm² or less in a case where the mass of the movable unit is 20 g, and ΔS×ΔG may be set to 6.6 mm² or less in a case where the mass of the movable unit is 5 g. As described above, this example can suppress the position detection errors regardless of the mass of the movable unit.

In this example, as described above, the actuators 501 and 502 are arranged so that the intersection of the first and second drive center axes β1 and β2 is closer to the center of gravity G of the movable unit than the intersection of the first and second detection center axes α1 and α2 of the position sensors 601 and 602. As described above, in order to efficiently drive the movable unit and accurately detect the position of the movable unit, the rotation of the movable unit around the lens center axis LC may be suppressed. Regarding the actuator 501, a rotation amount of the movable unit around the lens center axis LC is generated by the moment expressed as the product of the magnitude of the driving force generated by the actuator 501 and the distance between the first drive center axis β1 and the center of gravity G. Therefore, in order to suppress the rotation of the movable unit caused by the driving force, the first drive center axis β1 may be closer to the center of gravity G of the movable unit. This is similarly applied to actuator 502. That is, the intersection of the first and second drive center axes β1 and β2 may be closer to the center of gravity G than the intersection of the first and second detection center axes α1 and α2.

Generally, in a case where a movable unit is driven by two actuators, the center of gravity of the movable unit is often set to a position spaced apart from the lens center axis in the direction in which the two actuators are arranged. Even in this example, as illustrated in FIG. 3, the center of gravity G of the movable unit is located at a position spaced apart from the lens center axis LC in the direction in which the actuators 501 and 502 are arranged. However, in this example, the intersection of the first and second detection center axes α1 and α2 is located on or near the lens center axis LC, and the intersection of the first and second drive center axes β1 and β2 is closer to the center of gravity G than the intersection of the first and second detection center axes α1 and α2. Thereby, the movable unit can be restrained from rotating around the lens center axis LC, and the position detection error can be reduced even if the movable unit rotates around the lens center axis LC.

As described above, this example calculates the position of the movable unit from the outputs of the position sensors 601 and 602 arranged so that the first and second detection center axes α1 and α2 are not orthogonal to each other. Thereby, the arrangement of the position sensors 601 and 602 is not restricted so that the first and second detection center axes are orthogonal to each other, and the intersection of the first and second detection center axes α1 and α2 can be disposed on or near the lens center axis LC. Therefore, the arrangement freedom degree of the position sensors 601 and 602 can be increased while the position detection error of the movable unit is suppressed. By increasing the arrangement freedom degree of the position sensors 601 and 602, as illustrated in FIG. 7, a concave portion C can be formed between portions of the movable member 200 and the base member 210 in a direction around the lens center axis LC where the position sensor 601 is provided and portions of the movable member 200 and the base member 210 in a direction around the lens center axis LC where the position sensor 602 is provided.

Figure 7:
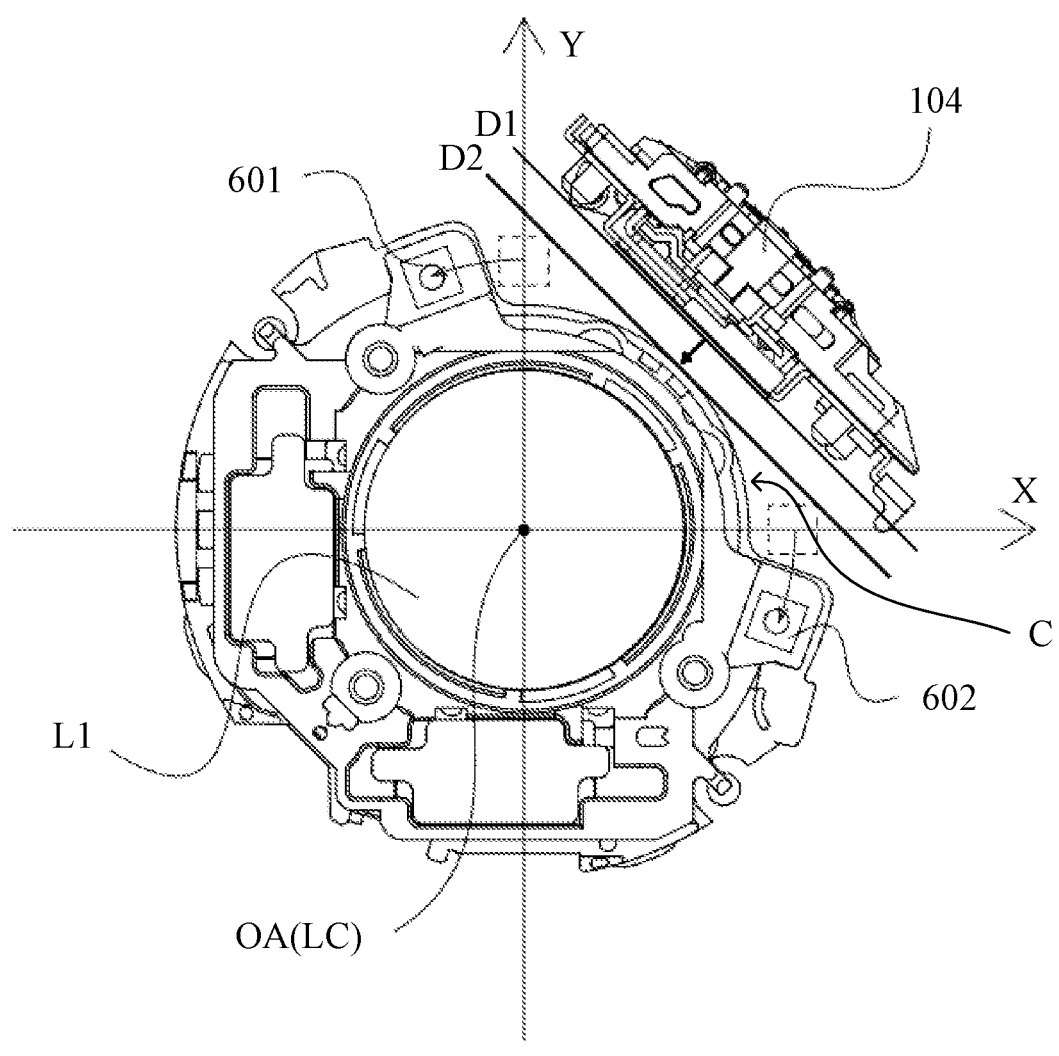
FIG. 7 is a rear view illustrating a focus actuator disposed within a concave portion in the image stabilizing unit according to Example 1.

In the conventional configuration in which the first and second detection center axes are orthogonal to each other as illustrated by a broken line in FIG. 7, the concave portion is short in the direction around the lens center axis and thus the focus actuator (a component of the lens apparatus other than the image stabilizing unit) 104 cannot be made closer to the image stabilizing unit 13 beyond a line D1. On the other hand, in this example in which the position sensors 601 and 602 are arranged so that the first and second detection center axes α1 and α2 form an obtuse angle, the focus actuator 104 can be made closer to the image stabilizing unit 13 up to a line D2. In other words, at least a part of the focus actuator 104 can be disposed within the concave portion C. Thereby, the radial size of the lens apparatus 12 can be made smaller than ever.

In Example 1, a magnetic position sensor includes a magnetic sensor and a sensor magnet, but this example may use an optical position sensor that includes a sensor having a light emitting part and a light receiving part and a reflective pattern that reflects light from the light emitting part towards the light receiving part. Alternatively, this example may place a magnetic sensor inside the coil of the actuator and use a drive magnet as the sensor magnet.

The component that can be disposed in the concave portion C includes an actuator unit of an electromagnetic diaphragm unit disposed on the object or image side of the image stabilizing unit, a lens holder similarly disposed, and a guide member such as a roller and a guide bar for guiding movement of the lens holder in the optical axis direction.

Example 2

Figure 8:
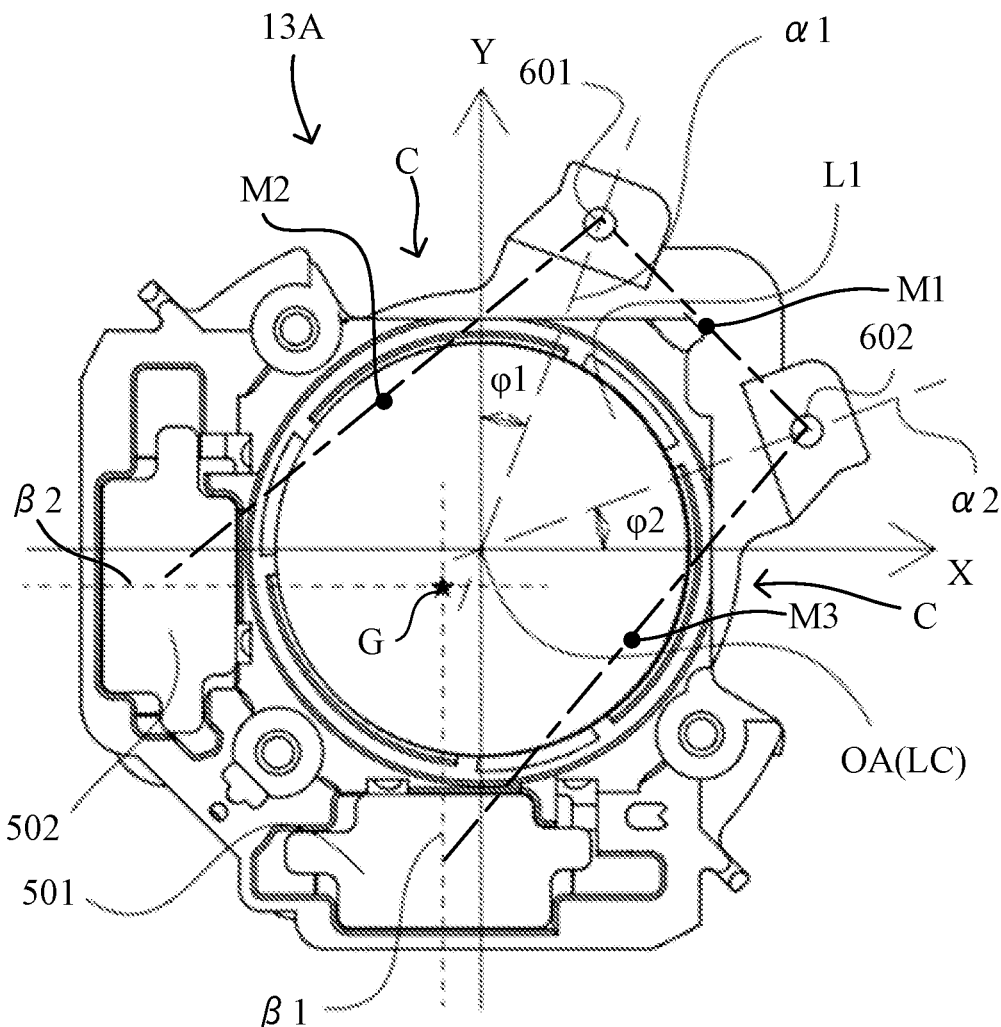
FIG. 8 is a rear view of an image stabilizing unit according to Example 2.

FIG. 8 illustrates an image stabilizing unit 13A according to Example 2 viewed from the image side (rear side). Even in this example, as in Example 1, the X-axis and the Y-axis are orthogonal to each other on a lens center axis LC. The first central drive axis β1 of the actuator 501 is parallel to the X-axis, and the second central drive axis β2 of the actuator 502 is parallel to the Y-axis. The intersection of the first drive center axis β1 and the second drive center axis β2 coincides with the center of gravity G of the movable unit, which is shifted toward the actuator side than the lens center axis LC. The first detection center axis α1 of the position sensor 601 and the second detection center axis α2 of the position sensor 602 intersect at the lens center axis LC. That is, each of the first detection center axis α1 and the second detection center axis α2 passes through the lens center axis LC. The intersection of the first drive center axis β1 and the second drive center axis β2 is located closer to the center of gravity G of the movable unit than the intersection (lens center axis LC) of the first detection center axis α1 and the second detection center axis α2.

On the other hand, in this example, the first detection center axis α1 of the position sensor 601 is tilted from the Y-axis by an angle φ1 in the clockwise direction around the lens center axis LC (on the side opposite to the actuator 502 side). The second detection center axis α2 of the position sensor 602 is tilted from the X-axis by an angle φ2 in the counterclockwise direction around the lens center axis LC (on the opposite side to the actuator 501 side). That is, an angle that is formed by the first and second detection center axes α1 and α2 and located in an area that includes a midpoint M1 between the detection centers of the position sensors 601 and 602 is not a right angle but an acute angle (an angle smaller than 90°). An angle that is formed between the first detection center axis α1 and the second drive center axis β2 and located in an area that includes a midpoint M2 between the detection center of the position sensor 601 and the driving force generating center of the actuator 502 is larger than 90° and smaller than 180°. An angle that is formed between the second detection center axis α2 and the first drive center axis β1 and is located in an area that includes a midpoint M3 between the detection center of the position sensor 602 and the driving force generating center of the actuator 501 is larger than 90° and smaller than 180°.

Even in this example, as in Example 1, the first detection direction of the position sensor 601 does not coincide with the first drive center axis β1 of the actuator 501, and the second detection direction of the position sensor 602 does not coincide with the second drive center axis β2 of the actuator 502. The positions of the movable unit in the X-axis and Y-axis directions can be also calculated from the outputs of the position sensors 601 and 602 at this time.

Similarly to Example 1, even this example may place each position sensor so that the product of ΔS and ΔG is 3.3 mm² or less.

This example can provide a concave portion C at a position different from that in Example 1, in which a component of the lens apparatus other than the image stabilizing unit 13A can be disposed. As in Example 1, even this example can suppress the rotation of the movable unit around the lens center axis LC, and reduce the position detection error even if the movable unit rotates around the lens center axis LC.

In each example, the base member 210 and the movable unit are arranged in order from the object side to the image side, but the order of arrangement may be reversed.

In each example, a voice coil motor is used as an actuator, but an actuator other than a voice coil motor, such as a vibration type motor or a stepping motor, may be used.

In each example, the image stabilizing element is a correction lens (image stabilizing lens), but the image stabilizing element may be an image sensor. That is, the image stabilizing unit may correct image blurs by moving the image sensor within a movement surface that intersects (or is orthogonal to) the optical axis.

In this example, the lens apparatus 12 includes the image stabilizing unit 13, but the optical apparatus may include a lens integrated type image pickup apparatus including an image stabilizing unit, a mobile phone with an image pickup apparatus, and binoculars other than the lens apparatus.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a compact optical image stabilization apparatus that suppresses position detection errors of a movable unit.

This application claims the benefit of Japanese Patent Application No. 2022-199973, filed on Dec. 15, 2022, which is hereby incorporated by reference herein in its entirety.

What is claimed is:

1. An optical image stabilization apparatus comprising:
    a movable member configured to hold an optical element;
    a base member configured to hold the movable member movably in a movement direction that intersects an optical axis of the optical element;
    a first position detector and a second position detector configured to detect a position of the movable member relative to the base member in a direction of a first detection axis and a direction of a second detection axis that are different from each other and parallel to a plane including the movement direction, respectively; and
    a first driving unit and a second driving unit configured to drive the movable member relative to the base member in a direction of a first drive axis and a direction of a second drive axis that are different from each other and parallel to the plane, respectively,
    wherein an angle formed by the first detection axis and the second detection axis is not a right angle,
    wherein at least one of the direction of the first detection axis and the direction of the second detection axis is different from each of the direction of the first drive axis and the direction of the second drive axis,
    wherein an intersection of the first drive axis and the second drive axis is closer to a center of gravity of a movable unit including an element fixed to the movable member among the optical element, the movable member, the first driving unit, and the second driving unit, than an intersection of the first detection axis and the second detection axis, and
    wherein on a plane parallel to the movement direction, a product of a distance between an intersection of the first detection axis and the second detection axis and the optical axis of the optical element, and a distance between an intersection of the first drive axis and the second drive axis and the center of gravity is 3.3 mm² or less.

2. The optical image stabilization apparatus according to claim 1, wherein an angle that is formed by the first detection axis and the second detection axis and located in an area that includes a midpoint between detection centers of the first position detector and the second position detector is larger than 90°.

3. The optical image stabilization apparatus according to claim 2, wherein an angle that is formed between one of the first detection axis and the second detection axis, and one of the first drive axis and the second drive axis and located in an area that includes a midpoint between a detection center corresponding to the one of the first detection axis and the second detection axis and a driving force generating center corresponding to the one of the first drive axis and the second drive axis is smaller than 90°.

4. The optical image stabilization apparatus according to claim 1, wherein an angle that is formed by the first detection axis and the second detection axis and located in an area that includes a midpoint between detection centers of the first position detector and the second position detector is smaller than 90°.

5. The optical image stabilization apparatus according to claim 4, wherein an angle that is formed between one of the first detection axis and the second detection axis, and one of the first drive axis and the second drive axis and located in an area that includes a midpoint between a detection center corresponding to the one of the first detection axis and the second detection axis and a driving force generating center corresponding to the one of the first drive axis or the second drive axis is larger than 90° and smaller than 180°.

6. The optical image stabilization apparatus according to claim 1, wherein when viewed from a direction of the optical axis of the optical element, an intersection of the first drive axis and the second drive axis coincides with the center of gravity.

7. The optical image stabilization apparatus according to claim 1, wherein an intersection of the first detection axis and the second detection axis is located on the optical axis of the optical element.

8. An optical apparatus comprising:
    the optical image stabilization apparatus according to claim 1; and
    a barrel configured to house the optical image stabilization apparatus.

9. The optical apparatus according to claim 8, further comprising a component that is at least partially disposed in a concave portion that is formed between portions of the movable member and the base member in a direction around the optical axis of the optical element where the first position detector is provided and portions of the movable member and the base member in the direction around the optical axis of the optical element where the second position detector is provided.

10. The optical apparatus according to claim 9, wherein the component is any one of an actuator configured to drive a lens or an aperture stop, a holder configured to hold the lens, and a member configured to guide movement of the holder in an optical axis direction.

* * * * *